United States Patent [19]
Bernier et al.
[11] 4,453,171
[45] Jun. 5, 1984

[54] REDUCED ELECTRODE WEAR IN ELECTROLYTIC PRINTING BY PH CONTROL OF THE PRINT REACTION ZONE

[75] Inventors: William E. Bernier; Charles R. Pigos, both of Endicott, N.Y.

[73] Assignee: International Business Machines Corporation, Armonk, N.Y.

[21] Appl. No.: 392,208

[22] Filed: Jun. 25, 1982

[51] Int. Cl.³ .............................................. G01D 15/06
[52] U.S. Cl. ......................................... 346/165; 204/2
[58] Field of Search .................. 346/165, 135.1; 204/2

[56] References Cited

U.S. PATENT DOCUMENTS 3,974,041 8/1976 Haruta et al. .......................... 204/2

*Primary Examiner*—Thomas H. Tarcza
*Attorney, Agent, or Firm*—Saul A. Seinberg

[57] ABSTRACT

A method of controlling the pH of a print reaction zone in an electrolytic matrix printer is described. Appropriate amounts of a buffering agent are included in the treated surface layer of the recording medium used in the printer to hold the pH of the print reaction zone in the range of 5.0 to 7.0 and, preferably, between 6.0 and 6.5. The pH of the electrolytic reaction zone can also be held in the desired range by adding appropriate amounts of a buffering agent to a supply of recording medium moistening fluid, either before and/or during actual printing, the latter step enabling dynamic buffering control if needed. The described method halts or reduces the degradation of print electrodes by effecting a balance between excess quantities of acid or base material generated in the print reaction zone during printing.

17 Claims, 4 Drawing Figures

REDUCED ELECTRODE WEAR IN ELECTROLYTIC PRINTING BY PH CONTROL OF THE PRINT REACTION ZONE

BACKGROUND OF THE INVENTION

1. Field of the Invention

This invention is concerned with a method for reducing the amount of electrode wear in a matrix printer. More particularly, this invention is directed to a methodology for reducing electrode wear in an electrolytic printer by controlling pH of the reaction zone in which printing is to be effected.

2. Description of the Prior Art

It is well known that printing on a moving recording medium will cause some wear of the print electrodes. Mechanically induced degradation of the print electrodes is generally accepted as an unavoidable fact in such situations, a trade-off for increased thruput. Prior art attempts to minimize the need to frequently replace worn electrodes have centered on increased plating thicknesses of cover material for the electrodes or on arrangements to separate the electrodes and the recording medium during its movement through the printer.

In the case of electrolytic printing, however, the problem of print electrode degradation is compounded by the effects of the electrolytic and/or chemical reactions that occur at both the anode and cathode of the printer. More specifically, in certain types of electrolytic printing, either the anode is subjected to an excess of acid and the chemical wear that results therefrom or the cathode is exposed to degradation from an excess of base. The prior art approaches can alleviate this aspect of the electrode wear problem, but cannot prevent the electrodes' consumption. For example, the print electrodes can be plated or covered in some fashion with a layer of inert, tough wearing protection. However, protective materials that will satisfy all requirements for covering a print electrode in this operating environment are few in number and difficult to coat using ordinary methods. Further, such approaches are costly and/or reduce the thru-put rates and print quality of electrolytic printers. While there have been some attempts to avoid etching or corrosive effects in ink jet printers by neutralizing the inks used, such buffering would not be effective in electrolytic printers because mere neutralization of one reaction component would not solve the problem of electrochemically induced print electrode deterioration.

OBJECTS AND SUMMARY OF THE INVENTION

Accordingly, it is a principal object of the present invention to provide a method for reducing or eliminating electrochemically induced print electrode wear in a matrix electrolytic printer.

It is also a principal object of the present invention to provide such a method wherein careful pH buffering of the recording medium surface is utilized to limit the effects of the electrolytic reactions on the print electrodes.

It is a further object of the present invention to provide a method of limiting electrode wear that can be dynamically adjusted without any need for modifying the printing process or thruput rate of the printer.

It is another object of the present invention to provide a method of limiting electrode wear that can be dynamically adjusted and which does not affect print quality or stability.

These and other objects of the present invention are achieved by a methodology of electrolytic printing wherein the surface of the recording medium to be used is buffered to a pH that strikes a balance between the normally occurring excessive acidic or basic electrode reactions. In general, this method contemplates holding the pH of the recording medium surface in a range of greater than 5.0 to 7.0. More specifically, the pH range should be held between 6.0 and 6.5 to avoid electrode degradation.

The correct pH range can be achieved by building the same into the print surface of the recording medium. Alternatively or in addition, the wetting agent employed to promote the electrolytic printing process can be pH adjusted to provide the proper recording medium surface pH value. This value may be effected by merely using a wetting agent having a predetermined pH or by monitoring recording medium surface pH and adjusting wetting agent pH, as needed, in compensatory response thereto. The overall effect of such buffering is to balance any excess acid or base material produced at the electrodes and thereby minimize or even completely negate their effects.

BRIEF DESCRIPTION OF THE DRAWINGS

The invention will he described further, by way of preferred examples thereof, with reference to the accompanying drawings wherein like reference numerals have been used in the several views to depict like elements, in which.

DESCRIPTION OF THE PREFERRED EMBODIMENT

Figure 1:
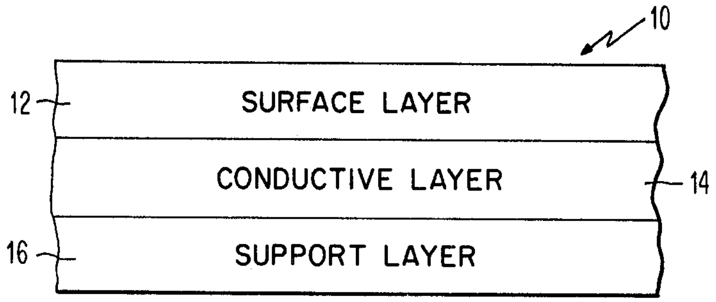
FIG. 1 schematically illustrates a simplified representation of a recording medium used in electrolytic printing.

As has been demonstrated in the prior art, electrolytic printing can be accomplished by controlling the voltage or the pulse width of a signal forwarded to and applied by print electrodes to a suitable recording medium 10. As is more completely described in the commonly assigned U.S. patent application Ser. No. 237,560, now abandoned, which was filed on Feb. 24, 1981 in the names of Bernier et al, the recording medium 10 consists of a surface layer 12, a conductive layer 14 and a support layer 16, see FIG. 1. The surface layer 12 is typically about 5 to 50 microns thick. It includes five main components, one of which is a pigment of appropriate color, generally a clay. The clay component is selected, as needed, to enhance or reduce the brightness, whiteness and/or absorbtion of the surface layer 12 in accordance with the end use. The surface layer 12 also includes as components thereof, a leuco dye, a dye stabilizer, a binder and an electrolyte. It is applied by coating the surface of conductive layer 14 with a predetermined amount of its components. A leuco dye is one whose chromophore is not visible under ordinary room conditions. However, it can be and is permanently shifted into the visible spectrum when a pulse of sufficient energy is applied thereto for an appropriate period of time.

The conductive layer 14 is generally formed from a thin metal foil, such as aluminum, about 1000 Angstroms thick or from a coating of sodium chloride (NaCl) or another suitable salt. The support layer 16 serves merely, as its name implies, to support the surface and conductive layers 12 and 14. It is typically from 15 to 50 microns thick and is fabricated from commonly available paper.

Figure 2:
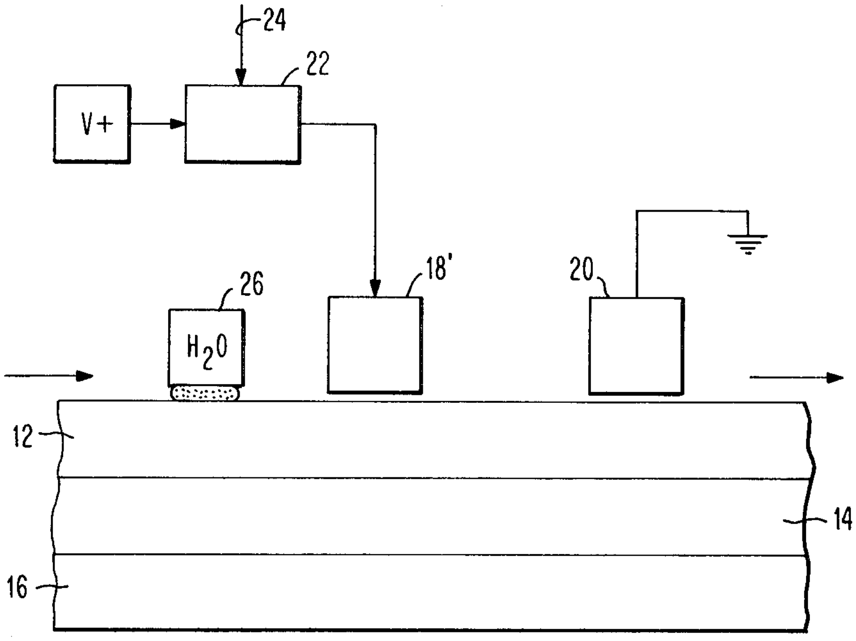
FIG. 2 schematically illustrates a simplified representation of electrolytic printing utilizing the recording medium shown in FIG. 1.
Figure 3:
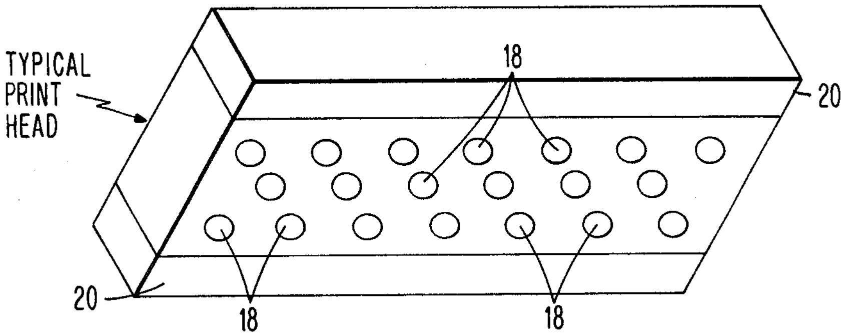
FIG. 3 depicts an example of a print head used in an electrolytic printer.

One possible electrolytic printing arrangement that would utilize a recording medium fashioned in accordance with the foregoing description is schematically illustrated in FIG. 2. As shown therein, the recording medium 10 is brought beneath a print stylus or electrode 18, the anode, by any suitable transport mechanism. The print stylus may be formed of a tungsten alloy or a ruthenium oxide coated member, which compound is very stable and exhibits little or no tendency to chemically enter into the printing process. The ground electrode 20, or cathode, would be fabricated from a similar, if not identical, material. Although only one anode and cathode have been shown in FIG. 2 for the sake of simplifying this description, a typical print head will have a minimum of 250 print electrodes, as is shown in FIG. 3.

A control circuit 22 is coupled between a voltage source V and the write electrode 18. Control circuit 22, which can be of conventional design. One control circuit design that is particularly suitable for use in an electrolytic color matrix printer is described in the commonly assigned U.S. patent application Ser. No. 391,777 by Dailey et al. Another suitable control circuit design is set forth in commonly assigned U.S. patent application Ser. No. 323,843, now U.S. Pat. No. 4,143,269 by Pawletko et al. The control circuit 22 serves to form and then selectively forward voltage pulses of appropriate amplitude and/or width to the print electrode 18. The pulses are formed and sent to the proper print electrodes by control circuit 22 pursuant to directions therefor received from a source of text or graphics to which it coupled by input bus 24.

In order to facilitate printing, a liquid supply 26 and applicator 28 therefor is provided. The details of a typical liquid metering system in which supply 26 and applicator 28 can be utilized will be found in commonly assigned U.S. patent application Ser. No. 240,332, now U.S. Pat. No. 4,335,967 Pawletko. The applicator 26 is adapted to uniformly meter out very small quantities of liquid over the surface layer 12 of recording medium 10 prior to its passing under the print electrode 18. The application of the liquid over the surface layer 12 serves a dual purpose. Since the print electrode 18 is positioned in loose contact with layer 12, the presence of liquid thereon reduces frictional forces and thereby enhances printing speed. In addition, the presence of the liquid greatly assists in promoting the electrolytic printing reaction by increasing conductivity of the recording medium 10, particularly its surface layer 12. From economic and safety standpoints, water is the preferred fluid to be used, but other liquids that are compatible with the surface layer components could be successfully employed.

As used herein, the term "printing reaction zone" means the general area in which printing takes place, that is, the immediate area of the surface layer 12 of recording medium 10 and the print electrodes 18 and 20. Printing is accomplished by application of the received pulse to the moistened top surface of recording medium 10. As a result of these pulses, free bromine ions that are coated into the surface layer 12 as part of the electrolyte component thereof, are converted to form bromine at the print electrode 18. This reaction proceeds in accordance with $$2Br^- \rightleftharpoons Br_2 + 2e^- \quad (1)$$

and $$2H_2O \rightleftharpoons O_2 + 4H^+ + 4e^- \quad (2).$$

The bromine made available by reaction (1) converts the leuco dye, that is, causes it to permanently shift into the visible spectrum, thereby forming a printed pixel beneath the print electrode 18. However, reaction (2) creates an excess of acid at the anode, due to the presence of extra hydrogen cations. As a direct result thereof, the print electrode 18 is etched or electrochemically eroded when an unbuffered surface layer 12 is used or the surface pH in the reaction zone is 5 or less. In an actual print head, similar to the one shown in FIG. 3, this electrochemically induced wear also affects the insulator material surrounding the anodes resulting in pitting and grooving of the print head's surface. In severe cases, some of the print electrode material has been plated onto the ground electrode 20 creating ridges of deposited material. This action reduces print quality and efficiency of bromine generation, but except for the extreme case noted above, little wear occurs on the cathode.

The electrochemical reaction induced at the cathode or ground electrode 20 proceeds according to $$4e^- + 2H_2O \rightleftharpoons 2OH^- + H_2 \quad (3).$$

The hydroxide anions, the $OH^-$, which do not recombine with the available oxygen, cause a potentially excessive alkaline environment to be created surrounding the cathode. If the reaction zone on surface layer 12 is shifted to a pH of 7 or more, these excess alkaline ions attack adjacent materials causing the cathode to experience electrochemically induced erosion. There is little or no wear induced at the anode by the base ions.

The degradation of the electrodes causes them to be replaced far too often and has a negative effect on print quality and printer thruput rates. It has been observed that low pH favors anodic degradation and high pH favors cathodic erosion. Utilization of a neutral pH surface layer 12 helps, but does not successfully avoid the electrode erosion problem since the generated excesses of acid and base have been found to be out of balance. The wear problem is arrested, however, by setting the pH of surface layer 12 in a range from 5.0 to 7.0 and, most preferably, in a range of from 6.0 to 6.5. Since bromine acts slowly on print head and electrode materials, careful pH control of the reaction zone at the top of surface layer 12, by holding it in the preferred range, would limit the acidic etching of the anode and surrounding material. Similar or even more favorable benefits are achieved at the cathode as a result of such pH buffering.

One way in which to control reaction zone pH is to buffer the surface layer 12 by including an appropriate material therein. Either calcium carbonate or potassium phosphate have been found to be suitable for this task. The calcium carbonate effects buffering in accordance with the reactions $$H^+ + CaCO_3 \rightleftarrows HCO_3^- + Ca^{2+} \quad (4)$$

at the anode and $$OH^- + HCO_3^- \rightleftarrows H_2O + CO_3^{2-} \quad (5)$$

at the cathode.

The reactions by which the potassium phosphate achieves buffering, noting that the potassium does not enter into these reactions, is $$H^+ + HPO_4^{2-} \rightleftarrows H_2PO_4^- \quad (6)$$

at the anode and $$OH^- + H_2PO_4^- \rightleftarrows HOP_4^{2-} + H_2O \quad (7)$$

at the cathode.

It would also be possible to buffer the reaction zone by including the correct amount of buffering agent in the liquid used to moisten surface layer 12. Thus, an appropriate quantity of a buffering agent could be added, as needed, to the liquid supply 26. Such an approach would allow the recording medium surface layer 12 to be set at a constant pH for manufacturing purposes, yet allow tuned buffering of the reaction zone to compensate for pH variations thereat. Such differences might be caused by aging of the recording medium, its storage or use environment, the nature of the print head materials or any other factors.

Figure 4:
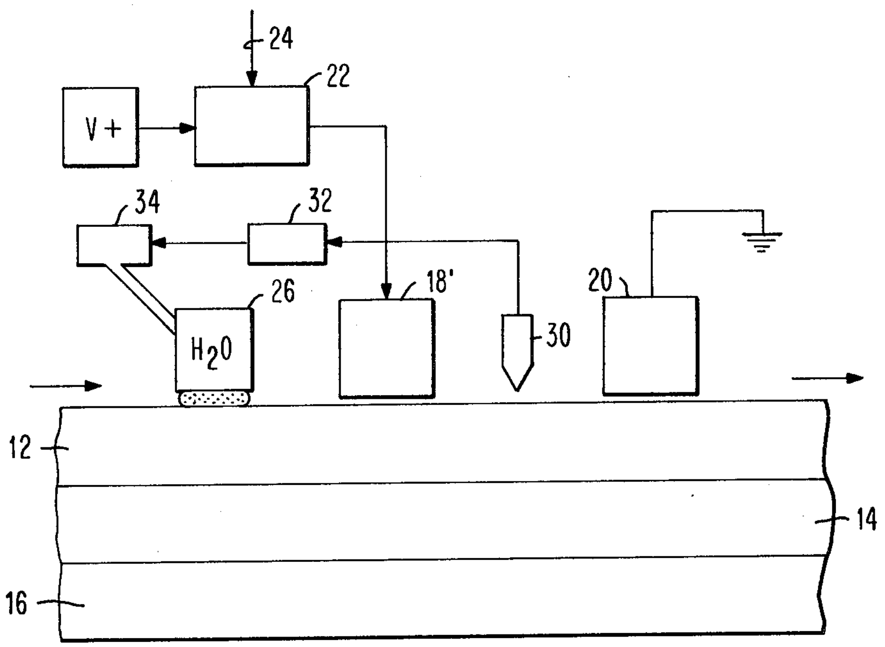
FIG. 4 schematically illustrates a simplified representation of electrolytic printing utilizing the recording medium shown in FIG. 1 that also incorporates automated buffering means in accordance with the present invention.

It would even be possible to dynamically effect buffering by adding a buffering agent to the liquid supply 26 in accordance with the actual need therefor, as measured by a sensor placed in the print head for that purpose. Thus, as shown in FIG. 4, a pH sensor 30 is positioned in the immediate vicinity of the print electrode 18. It measures the pH of the reaction zone atop the surface layer 12 and sends a signal proportional to the measured pH to comparison circuit 32 where it is compared to the desired pH. Comparison circuit 32 then generates an error signal proportional to the degree of variance between actual and desired pH, which signal is forwarded to a supply 34 of buffering agent. An outlet valve (not shown) of conventional design is then opened by the error signal, by an amount that will cause the correct quantity of buffering agent to flow via conduit 34 into the liquid supply 26 and subsequently drive the error signal to zero. Although this arrangement may act slowly, it does present a means for dynamically adjusting pH, as it may be needed rather than waiting for a batch of new moistening fluid to be mixed or another recording medium to be inserted in the printer. Consequently, the present invention minimizes or completely avoids the harsh effects of the excess acid or base materials by bringing them into a tenable balance by means of properly employed buffering.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. A method of controlling the pH of the print reaction zone of an electrolytic printer having at least one anode and one cathode, print control means, a recording medium having a treated surface layer including a leuco dye and a supply of fluid for wetting said recording medium, said method comprising the steps of:

(a) wetting said treated surface layer of said recording medium prior to printing thereon;

(b) transporting said wetted surface layer to a print reaction zone beneath said anode and cathode;

(c) applying an electrical pulse to said anode to cause said leuco dye to shift into the visible spectrum; and (d) maintaining said print reaction zone at a pH greater than 5.0 to 7.0.

2. The method according to claim 1 wherein the pH of said print reaction zone is held between 6.0 and 6.5.

3. The method according to claim 1 wherein the pH of the reaction zone is held within a desired range by adding buffering agent to said surface layer of said recording medium.

4. The method according to claim 1 wherein the pH of the reaction zone is held within a desired range by adding buffering agent to said supply of wetting fluid.

5. The method according to claim 1 wherein the pH of the reaction zone is held within a desired range by the added steps of monitoring the pH thereof, comparing the monitored result with a desired standard and then adding buffering agent to said supply of wetting fluid until the monitored and standard pH are in agreement.

6. The method according to claim 2 wherein the pH of the reaction zone is held within a desired range by adding buffering agent to said surface layer of said recording medium.

7. The method according to claim 2 wherein the pH of the reaction zone is held within a desired range by adding buffering agent to said supply of wetting fluid.

8. The method according to claim 7 wherein the pH of the reaction zone is held within a desired range by the added steps of monitoring the pH thereof, comparing the monitored result with a desired standard and then adding buffering agent to said supply of wetting fluid until the monitored and standard pH are in agreement.

9. A method of limiting print head and electrode degradation due to electrolytically induced reactions in the print reaction zone of an electrolytic printer which utilizes a recording medium having a treated surface layer, said reactions causing either an excess of acid to be liberated at the anode of said print head or an excess of alkaline at the cathode thereof, said method comprising the steps of:

(a) providing electrodes and a print head that are non-consumable under normal electrolytic printing conditions;

(b) determining the amount of acid generated at the anode as a result of printing;

(c) determining the amount of base generated at the cathode as a result of printing; and (d) buffering said print reaction zone in accordance with said determinations of the amounts of acid and base that are present to thereby balance and reduce the effects of such excess materials on said print head and electrodes.

10. The method according to claim 9 wherein said print reaction zone is buffered to have a pH of between 5.0 and 7.0.

11. The method according to claim 10 wherein the pH of the reaction zone is held within a desired range by adding buffering agent to said surface layer of said recording medium.

12. The method according to claim 10 in which said printer includes a supply of fluid for wetting said surface layer of said recording medium and wherein the pH of said reaction zone is held within a desired range by adding buffering agent to said supply of wetting fluid.

13. The method according to claim 10 in which said printer includes a supply of fluid for wetting said surface layer of said recording medium and wherein the pH of said reaction zone is held within a desired range by the added steps of monitoring the pH thereof, comparing the monitored result with a desired standard and then adding buffering agent to said supply of wetting fluid until the monitored and standard pH are in agreement.

14. The method according to claim 9 wherein said print reaction zone is buffered to have a pH of between 6.0 and 6.5.

15. The method according to claim 14 wherein the pH of the reaction zone is held within a desired range by adding buffering agent to said surface layer of said recording medium.

16. The method according to claim 14 in which said printer includes a supply of fluid for wetting said surface layer of said recording medium and wherein the pH of said reaction zone is held within a desired range by adding buffering agent to said supply of wetting fluid.

17. The method according to claim 14 in which said printer includes a supply of fluid for wetting said surface layer of said recording medium and wherein the pH of said reaction zone is held within a desired range by the added steps of monitoring the pH thereof, comparing the monitored result with a desired standard and then adding buffering agent to said supply of wetting fluid until the monitored and standard pH are in agreement.

* * * * *

UNITED STATES PATENT AND TRADEMARK OFFICE

CERTIFICATE OF CORRECTION

PATENT NO. : 4,453,171

DATED : June 5, 1984

INVENTOR(S) : W. E. Bernier and C. R. Pigos

It is certified that error appears in the above—identified patent and that said Letters Patent is hereby corrected as shown below:

Column 5, line 17, formula (7), that portion of the formula reading HOP should read HPO.

Signed and Sealed this

*Third* Day of *September 1985*

[SEAL]

*Attest:*

DONALD J. QUIGG

*Attesting Officer* *Acting Commissioner of Patents and Trademarks - Designate*